(12) United States Patent
Herrick et al.

(10) Patent No.: US 10,247,277 B1
(45) Date of Patent: Apr. 2, 2019

(54) CABLE GRIPPER SYSTEM

(71) Applicant: RODDIE, INC., Columbia Falls, MT (US)

(72) Inventors: Rod Herrick, Whitefish, MT (US); Jared W Shappell, Kalispell, MT (US)

(73) Assignee: RODDIE, Inc., Columbia Falls, MT (US)

( * ) Notice: Subject to any disclaimer, the term of this patent is extended or adjusted under 35 U.S.C. 154(b) by 0 days.

(21) Appl. No.: 15/880,538

(22) Filed: Jan. 26, 2018

Related U.S. Application Data

(60) Provisional application No. 62/451,502, filed on Jan. 27, 2017.

(51) Int. Cl.
*B25J 15/00* (2006.01)
*F16L 3/08* (2006.01)
*F16G 11/10* (2006.01)
*B61B 12/12* (2006.01)
*E21B 19/12* (2006.01)

(52) U.S. Cl.
CPC ............ *F16G 11/108* (2013.01); *B61B 12/12* (2013.01); *E21B 19/12* (2013.01)

(58) Field of Classification Search
CPC ............................. F16G 11/108; B25J 15/0061
USPC .............. 294/106, 132, 213, 119.1; 148/74.1
See application file for complete search history.

(56) References Cited

U.S. PATENT DOCUMENTS

| | | | | |
|---|---|---|---|---|
| 2,291,413 | A * | 7/1942 | Siebrandt | A61B 17/8861 140/121 |
| 2,886,361 | A * | 5/1959 | Matson | F16G 11/108 403/17 |
| 4,657,284 | A * | 4/1987 | Fiori | F16L 23/10 24/20 S |
| 5,553,979 | A * | 9/1996 | Wittig | E02D 9/02 166/93.1 |
| 6,440,145 | B1 * | 8/2002 | Assawah | A61B 17/08 24/514 |
| 6,595,472 | B1 * | 7/2003 | Pisczak | G02B 6/483 248/74.1 |
| 8,500,073 | B2 * | 8/2013 | Quesnel | H02G 7/053 24/285 |
| 9,948,080 | B2 * | 4/2018 | Bentley | H02G 7/125 |
| 10,103,525 | B2 * | 10/2018 | Baptiste | H02G 1/06 |
| 2012/0112014 | A1 * | 5/2012 | Eshinna | H02G 3/32 248/68.1 |
| 2013/0146721 | A1 * | 6/2013 | White | H02G 3/32 248/68.1 |

* cited by examiner

*Primary Examiner* — Paul T Chin
(74) *Attorney, Agent, or Firm* — Robin Kelson Consulting, Inc.

(57) ABSTRACT

Disclosed is an integrated mechanical means for gripping and releasing a cable or wire rope comprising opposing gripper members having a cable gripping surface and mechanical means for timing the closing and opening of the gripper members about a cable surface such that each gripping member applies substantially the same pressure to the cable or wire rope surface at substantially the same time.

9 Claims, 6 Drawing Sheets

CABLE GRIPPER SYSTEM

CROSS REFERENCE TO RELATED APPLICATIONS

This application claims the benefit of Provisional Application No. 62/451,502, filed Jan. 27, 2017, the disclosure of which is hereby expressly incorporated in its entirety by reference herein.

FIELD OF USE

Embodiments of the present disclosure find applicability in the field of cable or wire rope clamping and gripping mechanisms. One useful field includes the field of horizontal directional drilling. Another field is the field of drilling, including vertical drilling. Still other fields include any field where cable clamping or winching is required as part of moving cable through space, including for example, chair lift, gondola and cable car applications, ship anchor placement applications, and dredging applications, to name a few.

BACKGROUND

It is common practice in fields and industries that require pulling metal cable or metal rope through space to use a cable gripping mechanism that includes the ability to grip and release the cable on demand, so the cable can be pulled through space. Oftentimes, the pulling apparatuses utilize a pair of gripping mechanisms, one gripping while the other is released so the cable can effectively be pulled "hand over hand." In these circumstances the gripping mechanisms work in tandem to create a winching mechanism or system for intermittent and continuous heavy pulling, lifting and lowering.

Ideally, the grip and release mechanism is designed to prevent the cable slipping backwards. In addition, the mechanisms typically include a gripper having an inner surface that defines an aperture or axial channel for the cable or wire rope, lined with "teeth" that bite the cable and hold it in position as the gripper is forced down on to the cable. These "teeth" typically are created by means of serrations or threaded ridges on the cable engaging surfaces of the axial channel.

In part because of the great force placed on the cable as it is being pulled (typically, cable pulling machines can have a pulling force of anywhere from about 6 to 100+ tons) the cable can have a tendency to twist as it is pulled, making it difficult to maintain an even grip or pressure on the cable with cable gripping mechanisms in the art. Thus cable gripping mechanisms or systems in the art are subject to great wear and tear, and have a tendency to seize, and/or require the need for anti-seize lubricants to allow them to function properly in the field. Another impact of the great force systems in the art apply to cable or wire rope surfaces is that they "bite" the cable so strongly they tend to cut the individual wire strands, fraying the rope or cable and thereby weakening it.

Many gripper mechanisms typically in use in the art work on a wedge principle where the cable or wire rope is sandwiched between member segments that together define a wedge set. As the wire rope is pulled, each half of the wedge set is forced down onto the cable, squeezing the cable or wire rope, and biting the rope with gripper "teeth". Often the wedge slides along a tapered surface so that the wedge pieces are forced down onto the cable or wire rope as the wedge moves forward along the taper. Generally, movement occurs due to a force applied to the rear of the wedge, for example mechanically by a spring, or hydraulically. (See, for example, Chant Engineering's "Wire Rope Grips", http://www.chantengineering.com/wirerope.php?I=1.) See, also US published patent application 2016-0348807-A1. Another wedge gripper is illustrated by the vertical pulling apparatuses of TricTools, Inc., (see http://www.trictools.com/product-category/pulling-units/.) In this system, the wedge segments are forced onto the cable surface by both a slide mechanism and by a series of elastomers that bind the segments to the slide mechanism. Still another system illustrated by Pow-r Mole Sales LLC uses a levering means to translate hydraulic force to a wedge segment in a vertical gripping system. The lever has a central pivot point. As hydraulic force pushes one end of a lever up, the other end of the lever, attached to a wedge segment, is forced down or onto the cable surface. Like the other systems in the art, these wedge segments are acted on independently. In addition, the force translation in the lever system is such that cable gripping can result in cable fraying.

Existing gripper systems often are multi-piece systems that can be complicated or cumbersome to install, especially in a vertical pulling system. One drawback of existing gripper mechanisms is the number and complexity of components to the mechanism that can break in the field, in part due to the high pressure exerted on them, and the difficulty in keeping tension even on the cable from both gripper wedges. The multiplicity of independent components also can make the gripper mechanisms difficult or cumbersome to install, remove or repair, especially in the field. Sliding wedge components can have a tendency to seize and so can require use of anti-seizing compounds, making the grippers difficult to clean. In addition, these systems typically are open systems, and debris can get caught between the gripper wedges and the tapered or sliding surface, making seizing more likely and/or otherwise impeding proper movement of the wedges and even pressure on the wire surface. Cleaning the debris out in the field can be cumbersome at best, and often difficult. Keeping the system in good working condition in open systems typically requires taking the components apart and carefully cleaning out debris and excess grease or lubricant, also a tedious and cumbersome activity.

In systems using large wedge pieces that grip a long length of cable, proper cleaning is especially difficult. Moreover, where the applied force is provided hydraulically, an additional system (the hydraulic system) with its own maintenance and power needs, has to be maintained and managed in the field.

In addition, some gripping mechanisms work only in a vertical or horizontal system, but not both. This can be a drawback in designing pulling or winching systems for multiple applications where it can be advantageous to utilize a range of pulling positions for different operations. It would be advantageous to have a "universal" gripper system that can work in either a vertical or horizontal position without modification. It also would be advantageous for the gripper system to be able to occupy both the "front" and "rear" position without modification, in tandem cable gripper systems where the grippers form part of a "hand over hand" cable winching system with front and back cable grippers alternating gripping the cable.

There remains a need for a wire rope or cable gripper system that provides consistent, timed pressure on both sides of a cable during operation, and can provide that pressure mechanically without requiring an additional system to move it; that can be installed as a unit; that is easy to use and maintain; that has few moving parts; is less subject to wear and tear; that is small and compact; that can be fabricated as a "closed system" such that the force translations means is not impacted by debris in the field; that can be applied in both horizontal and vertical systems; that does not require a sliding surface to support engaging and gripping a wire rope surface, and that is not subject to seizing, even under high pulling forces.

The present disclosure describes improvements in metal cable or rope gripping mechanisms and methods of use thereof that overcome deficiencies in the mechanisms and devices of the prior art.

SUMMARY

This summary is provided to introduce a selection of concepts in a simplified form that are further described below in the Detailed Description. This summary is not intended to identify key features of the claimed subject matter on its own, nor is it intended to be used on its own as an aid in determining the scope of the claimed subject matter.

In accordance with one embodiment of the disclosure provided herein is a novel cable or wire rope gripping and release device or mechanism. The device has several advantages over devices and mechanisms in the art, including being an integrated system that can be installed as a single element, being compact, and using a simple, mechanical timing and pivoting means for gripping a cable surface. The simplified gripping and release means provided by the device of the instant disclosure can be used in vertical and horizontal cable pulling apparatuses, and does not have to be modified when used in tandem for winching or pulling applications.

In one embodiment, the gripper mechanism is a system comprising two opposing gripper members, each member having a concave inner cable gripping surface, the two concave surfaces of each member together defining an axial opening or channel for a cable. In another embodiment, the two opposing members are substantial mirror images of one another.

In still another embodiment, the integrated gripper device or mechanism of the instant disclosure comprises mechanical means for timing the closing and opening of the gripper members about a cable surface such that each gripping member applies substantially the same pressure to the cable or wire rope surface at substantially the same time. In another embodiment, the mechanical timing means is carried out by means of a gearing mechanism. In another embodiment, each gripping member has a gear segment attached to it such that, as the gears are moved, the gear teeth engage and bring the gripper members, and the concave cable gripping surfaces, together. In a preferred embodiment the gear ratio is 1:1. In another preferred embodiment, when the integrated gripper device is installed, the two gear segments are always at least partially engaged. Thus, in another embodiment, the gripper system comprises means for nominally engaging the opposing gripper wedge segments.

In another embodiment, means are provided for engaging the gear segments in the integrated gripper device. In one embodiment, the engagement means includes means for providing sufficient tension between the two gripper members to keep the gear segment teeth at least partially engaged. In one currently preferred embodiment, the tension means can be provided by means of an elastomer, including an O-ring.

In still another embodiment, the timing mechanism is engaged by means of a mechanical pivot, hinge, swing, or moveable joint competent to transfer force to the gearing mechanism and open or close the gripper members thereby. In still another embodiment, the pivot can comprise a shaft detachably engaged with at least one gripper member, such that rotation of the shaft about an axis rotates the gripper member and the attached timing mechanism, thereby opening or closing the mechanism off or on the cable surface, depending on the direction the pivot shaft is rotated. In another embodiment, the pivot shaft can be perpendicular to the gearing mechanism.

In still another embodiment, the gripper mechanism also can comprise means for locking the device in a preferred position, typically in an open position, for ease of inserting or removing a cable from the device. In one preferred embodiment, the locking mechanism can comprise a shaft detachably engaged with one gripper member and means for locking the gripper member in a desired position. In the embodiment where the two gripper members are always at least partially engaged via the gearing mechanism, locking one member can prevent the other member from moving. In one embodiment, the locking shaft can be perpendicular to the gearing mechanism. In still another embodiment, the locking shaft can be the same shaft as the pivot shaft for rotating the gripper member. In yet another embodiment, the locking shaft is located on the opposite gripper member from the pivot shaft.

In yet another preferred embodiment the integrated gripper device of the instant disclosure can comprise two gripper members, each member having a concave inner cable gripping surface, the two concave surfaces of each member together defining an axial opening or channel for a cable when the gripper members are brought together, the upper surface of each member comprising a gear segment with common gear ratio, means for keeping the gear segments at least partially engaged, and means for mechanically transferring force to at least one gear segment sufficient to engage the gear segment teeth on the other member and bring the gripper members together or apart as desired.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Embodiments of the present disclosure provide devices, components, mechanisms and methods of use directed to improved means for gripping a cable or wire rope surface, particularly a cable or wire rope to be pulled through space.

Figure 1:
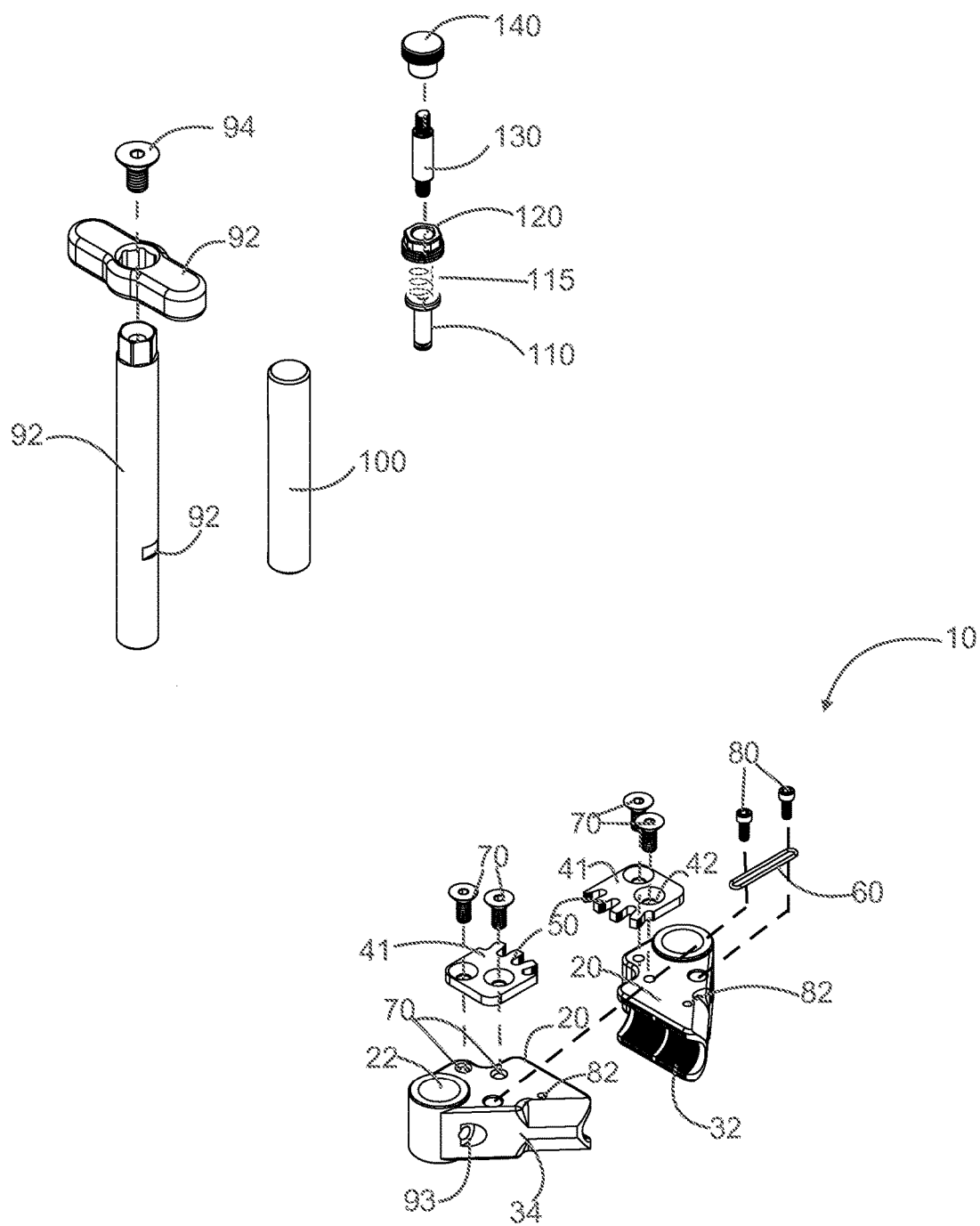
FIG. 1 is an exploded view of a timed gripper system of the present disclosure.
Figure 2:
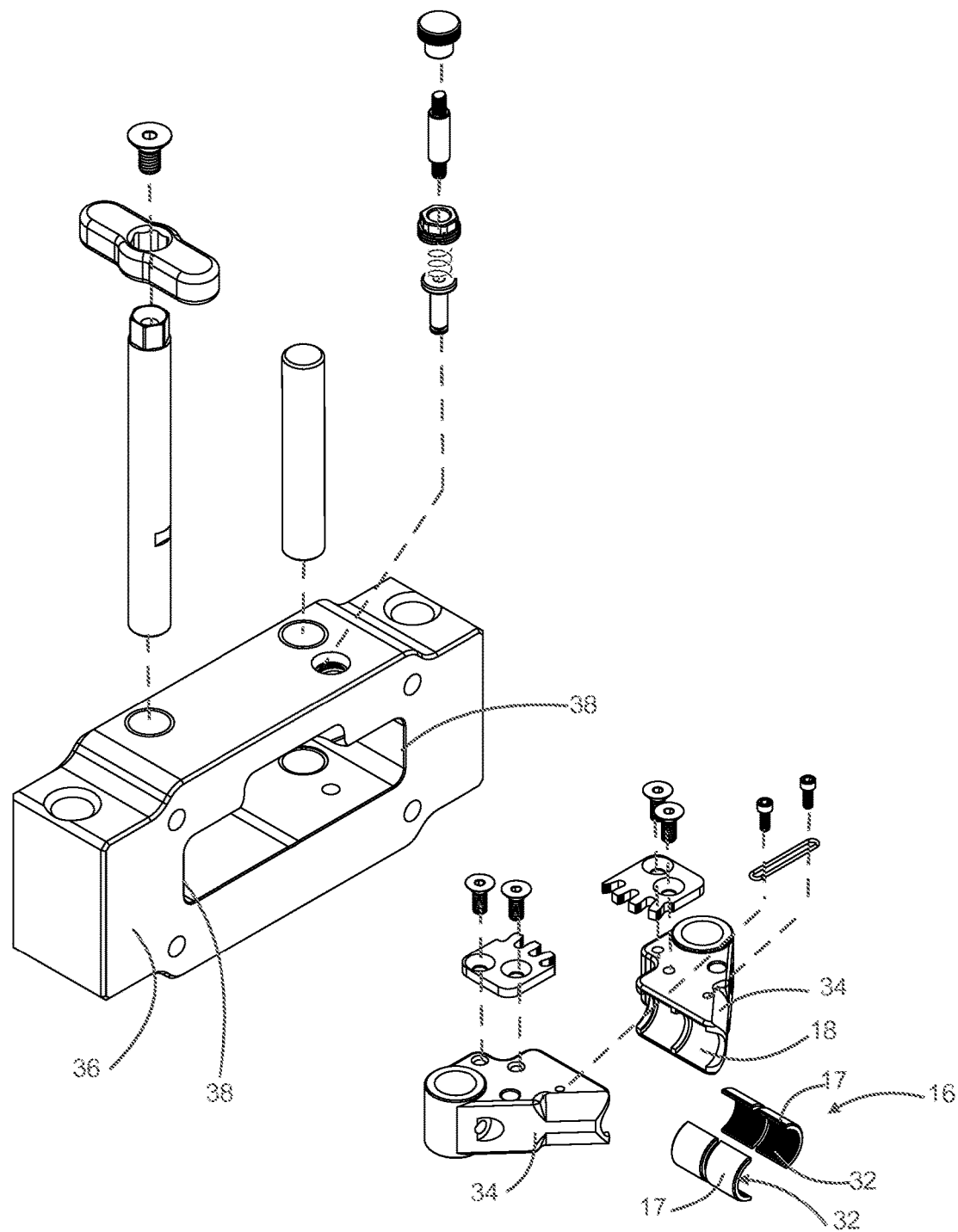
FIG. 2 is an exploded view of a timed gripper system, according to another embodiment of the present disclosure.
Figure 3:
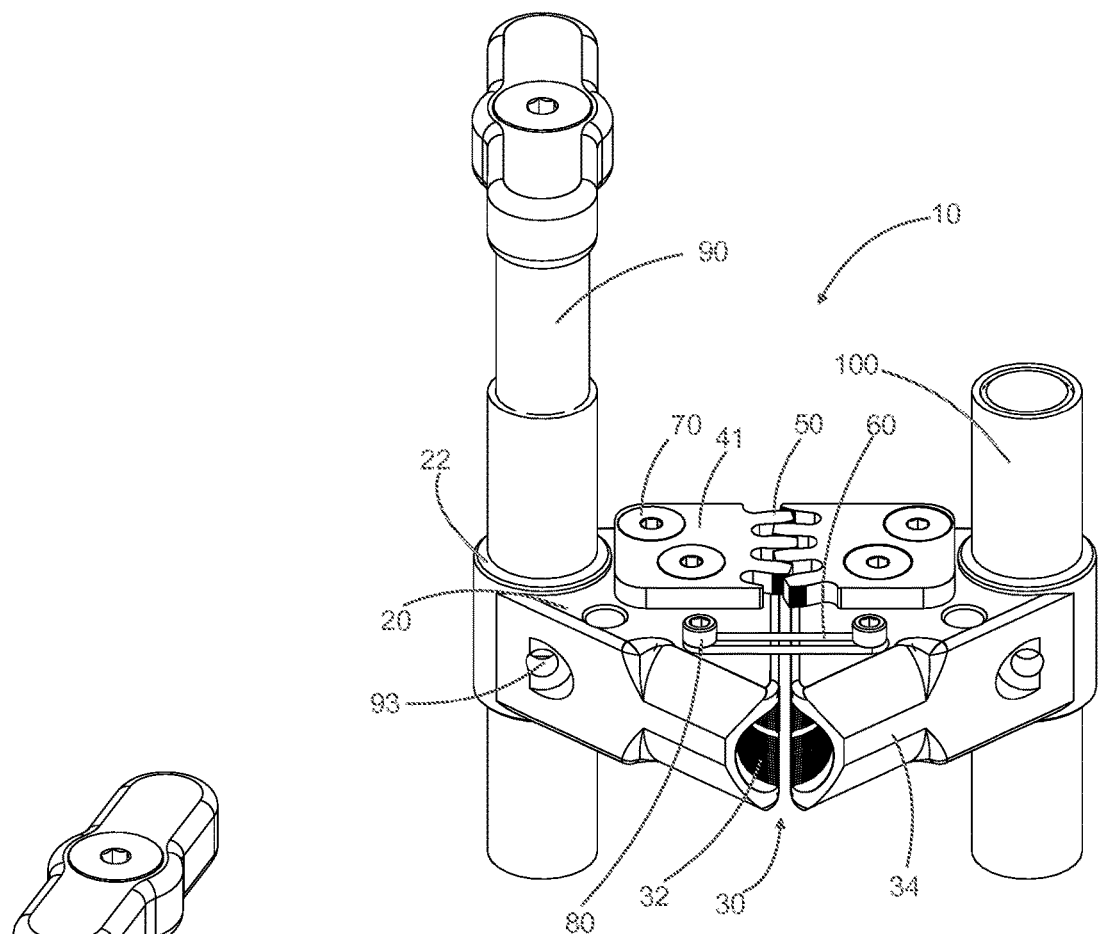
FIG. 3 is a perspective view of a timed gripper system of the present disclosure in a closed position.

Referring to FIGS. 1, 2 and 3, two embodiments of a useful timed cable gripping mechanism and device in accordance with the present disclosure are shown. In the figures, embodiments of a gripper mechanism 10 are illustrated in an exploded view. Gripper mechanism 10 comprises a plurality of gripper wedge pieces 20. Typically the gripper mechanism comprises a pair of opposing wedge pieces that are mirror images of one another, and other numbers of wedge pieces are envisioned to be useful. Wedge pieces 20 comprise an inner, concave surface 32 shaped and dimensioned to fit on the surface of a metal cable or wire rope such that, when mirror image wedge pieces 20 come together, concave surfaces 32 together define an axial aperture or channel 30 dimensioned to receive a cable or wire rope. In a preferred embodiment, concave surfaces 32 are ribbed or cut or otherwise textured to enhance the ability of concave surface 32 to "bite" into and hold to the metal surface when wedge 20 is pressed down onto the wire rope or metal cable.

The gripping devices of the present disclosure have a timing means for timing the opening and closing of concave surfaces 32 onto a cable surface such that surfaces 32 grip and hold the cable with substantially the same force. In the figures the timing mechanism of the present disclosure is illustrated by mirror image gear segments 41 attached to a surface of opposing mirror image wedge pieces 20, positioned such that, when a wedge piece 20 is pivoted about a hinge point 22, gear teeth 50 on the two segments 41 engage with each other. Because gear segments 41 are substantial mirror images on wedge pieces 20, the gear ratio between segments 41 is 1:1. Thus, as one wedge piece is pivoted about hinge point 22, engaged gear segments 41 translate the force of the pivot motion into substantially equal pressure applied to the rope or cable surface from both wedge piece inner gripping surfaces 32. It will be appreciated by those of ordinary skill in the art that the number of gear teeth 50 on each gear segment 41 can be any desired number, and the size and shape of gear segments 41 can be varied as desired depending on the size of wedge pieces 20, the diameter of cable to be gripped and the amount of gripping and/or pulling force to be applied to the cable surface. Similarly, the choice of metal composition for gear segments 41 and gear teeth 50 can be made taking into account these standard variables.

Gear segment 41 can be integrally or removably attached to a surface of wedge piece 20 by any standard means. In the figures, bolts 70 pass through apertures 42 on the segment and bolt into apertures 72 on wedge piece 20. Other means of attachment are contemplated and are within the skill in the art to apply.

Figure 4:
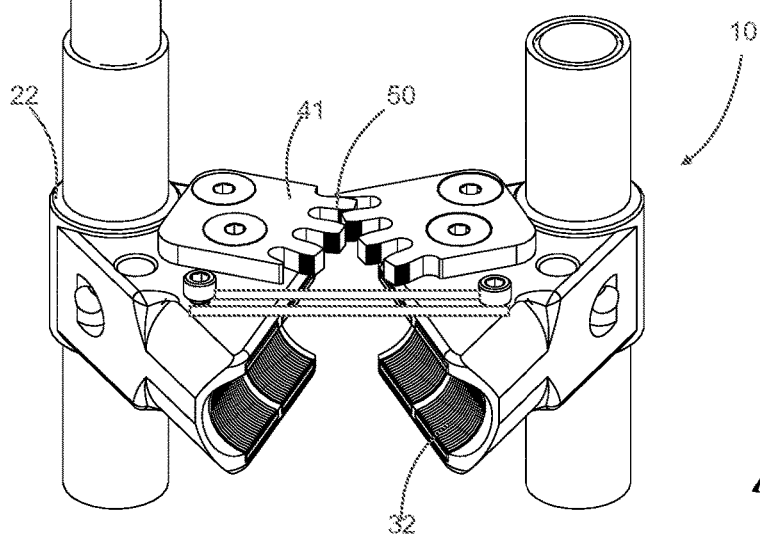
FIG. 4 is a perspective view of a timed gripper system of the present disclosure in an open position.

In another embodiment, wedge pieces 20 also can have means for modulating or limiting their rotation relative to one another. In one embodiment, means can be provided for keeping the pieces nominally engaged, for example by keeping gear segments 41 nominally engaged with one another. This allows for substantially easy and seamless alignment of the segments and pieces when one wedge piece is pivoted, without requiring gear teeth to "catch" on their own. One useful means for nominally engaging segments 41 is by means of some kind of tension-inducing tether, for example by means of an elastomer. In the figures, a tension bolt 80 extends up from the upper surface of wedge 20, by attaching to a bolt opening 82. An elastomer, such as an O-ring 60, then can be stretched across two opposing tension bolts, the elastomer's stretching capacity defining the limit to which wedges pieces 20 can be rotated away from one another via a pivot point 22. FIGS. 3 and 4 illustrate an embodiment where an elastomer 60 limits the cable surface aperture of the wedge pieces in the gripper assembly. In FIG. 3 the wedge pieces are in close proximity, the inner concave surfaces 32 together defining a channel for receiving a cable or wire rope. In FIG. 4, wedge pieces 20 are rotated away from one another via pivot point 22, and the central channel 30 is open engagement of segment teeth 50, such that a cable easily can be added or removed.

Figure 5:
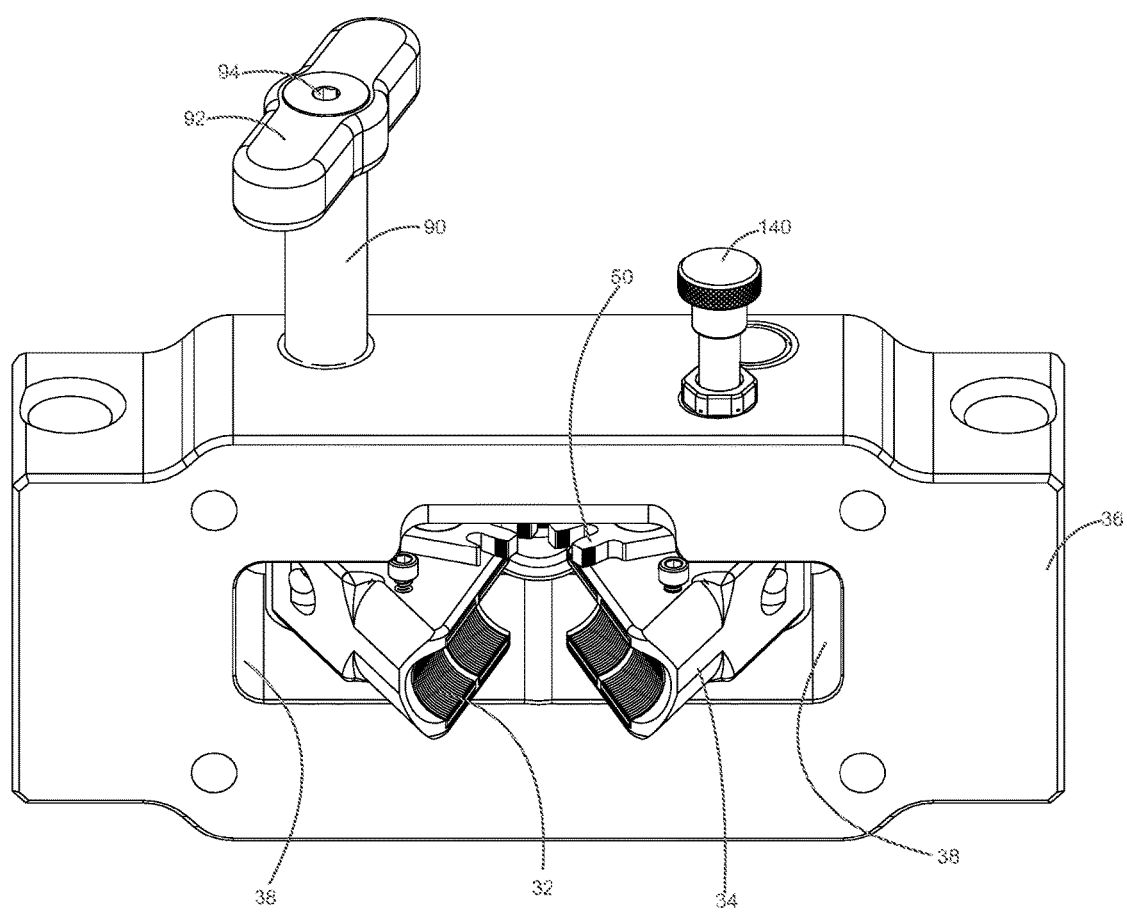
FIG. 5 is a perspective view of a timed gripper system of the present disclosure in an open position, according to another embodiment of the present disclosure.
Figure 6:
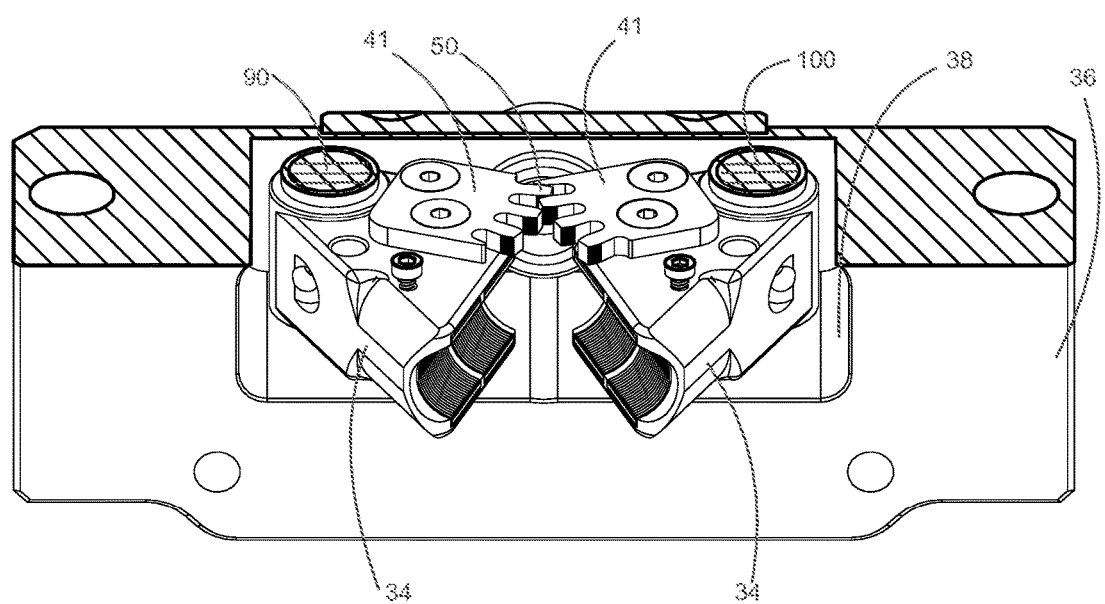
FIG. 6 is a cut-away view of the gripper system of FIG. 5.
Figure 7:
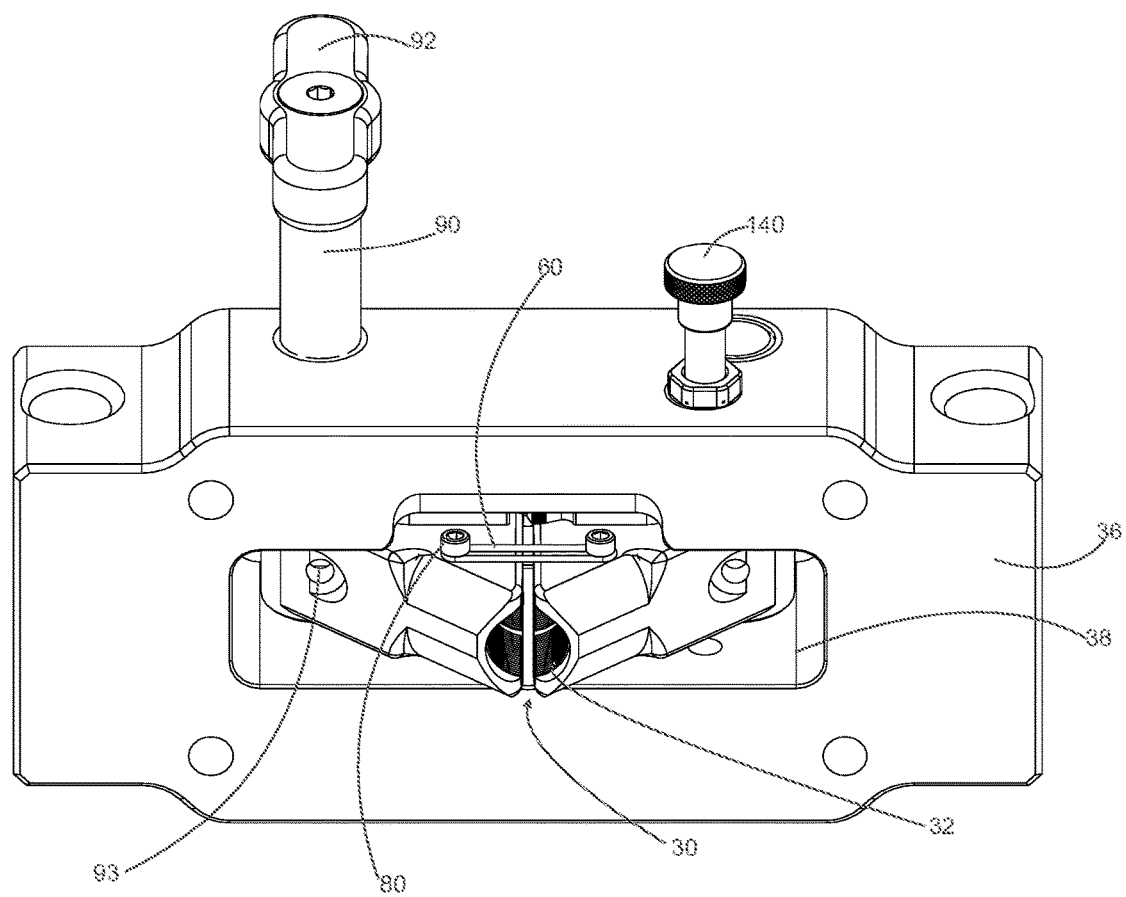
FIG. 7 is a perspective view of a timed gripper system of the present disclosure in an closed position, according to another embodiment of the present disclosure.

In another embodiment, means for limiting wedge piece rotation can be achieved by creating an external boundary around their rotation. In FIG. 2, for example, a manifold or casing 36 has an opening dimensioned to receive a gripper mechanism 10 and has opposing surfaces 38 positioned and dimensioned to limit the degree to which wedge pieces 20 can rotate away from one another at a pivot point 22. That is, as the wedge pieces are rotated apart, an outer surface 34 of wedge piece 20 contacts casing wall 38, limiting further opening of the cable axial channel. See, for example, FIGS. 5-7.

Rotation of wedge pieces 20 about a pivot point can occur by any of a number of means, ease of operation being a primary consideration. In the figures pivot point 22 comprises a rotatable shaft 90 attached to wedge piece 20. In a preferred embodiment, shaft 90 is removably attached to wedge 20. In the figures, shaft 90 sits in a channel or aperture 22 (the pivot point) in wedge 20, and can be removably attached to wedge 20 by, for example, a set screw 93 that engages a set crew flat 96 on shaft 90. Of course, other means such as splines and keys, can be used to attach shaft 90 to wedge 20. Shaft 90 is readily moved by means of a handle 92, attached to shaft 90 via handle nut 94. Of course other pivot means and handle means are contemplated and within the skill of the art to fabricate, provided with the instant disclosure. In FIGS. 1-5, and 7, rotation of shaft 90 occurs mechanically by means of handle 92. Those skilled in the art will appreciate that other means of rotating shaft 90 or 100 are contemplated and within the skill in the art to design and fabricate, including using other mechanical means or non-mechanical means, such as hydraulic means.

In another embodiment, means for locking the timed wedge pieces of the instant gripper assembly into an open position also are provided by the instant disclosure. Locking the wedge pieces in an open position is advantageous because it facilitates inserting and removing cable without needing separate means to keep the gripper pieces open and apart. This can be particularly difficult and cumbersome in vertical gripper systems in the art. In the figures, a pivot point shaft becomes a useful locking mechanism. In the figures wedge pieces 20 are mirror images of one another. Thus each wedge piece has an available pivot shaft opening or aperture. However, only one pivot shaft is needed since the two gear segments time the rotation of both wedges when pivot shaft 90 pivots its attached wedge piece. Accordingly, a second shaft 100 can be used on the opposing wedge as part of a locking mechanism. Like pivot shaft 90, locking shaft 100 can attach to its wedge piece by any means, including by means of a set screw. In addition, shaft 100 can include means for mechanically locking its attached wedge in an open position on demand. In the figures, shaft 100 is spring loaded, for example, by means of a locking pin 110, spring 115, retaining nut, 120, shaft 130, and rotatable knob 140. Of course, other means for achieving this locking function are within the skill of the art, given the instant disclosure, including fabricating a locking mechanism within pivot shaft 90.

One of the advantages of the gripper assemblies or systems of the instant disclosure and which distinguishes them over systems in the art is the added gripping value provided by the gearing mechanism. In the systems in the art, once the gripper system is in place on the wire surface and the cable is being pulled on, tremendous force is being applied at the front of the wedge and the cable is being held in place primarily by the biting capacity of the inner, concave, cable gripping surfaces. This causes great wear and tear on these surfaces and also can lead to cable fraying. In the assembly of the instant disclosure, by contrast, the timed gears, which are placed towards the rear of the wedge, helps keep the wedge pieces closed on the cable surface, with even pressure. This can provide more even gripping along the length of the wedge's cable receiving channel, providing better gripping and less wear on the cable biting surface. It also can allow for better and more precise modulation of the force translation onto the cable surface, thereby better preserving the cable's surface integrity and reducing any tendency to cause cable fraying.

Another means for enhancing the longevity of the wedge piece's cable gripping surface is by means of gripper inserts. Referring to FIG. 2, one embodiment of a useful cable gripper insert is shown. In the figure, cable gripping surface 32 comprises at least one insert 16 that sits in a recess 18 of wedge piece 20. Thus insert 16 itself comprises an outer, gripper body engaging surface 17 dimensioned and configured to sit in recess 18, and an inner, cable engaging surface 32, typically textured or threaded to bite the cable. Thus the gripper comprises means for receiving a cable gripping insert. In the embodiment in the figure, two inserts are shown. As will be appreciated by those skilled in the art, fewer inserts (e.g., one) and more inserts (e.g., three or more) also can be used to advantage.

In the figure the gripper body insert receiving surface comprises one or more recesses 18 dimensioned to receive the insert. In the figures the insert recess surface comprises a series of recesses or channels dimensioned to receive the individual inserts and the channels (and the inserts they hold) are separated by dividers or steps in the recess axial opening. The dividers provide means for holding the insert(s) in position in the recess. The cable engaging surface of the dividers also is configured to engage the cable and can be textured or threaded to bite the cable. Means can be provided for further affixing the insert in position in the recess or channel using, for example, epoxy or silicon. Other embodiments and means for engaging cable gripper inserts with a cable gripper body are disclosed in co-pending, commonly owned U.S. Ser. No. 15/681,048, "Cable Gripper Insert," filed Aug. 18, 2017, having the same inventive entity, the disclosure of which is incorporated herein by reference.

It will be appreciated by those skilled in the art that, provided with this disclosure, means now are provided for fabricating cable gripper wedge sets or jaws of multiple, different metals. In particular, it now is available for the fabricator to select a metal of a desired hardness for enhanced or preferred cable gripping capability, without compromising the load bearing requirements of the gripper body. For example, useful insert metals can include metals having a Rockwell rating greater than 62. Carbide steel, for example, may be used to advantage. Similarly, gripper bodies now can be fabricated of a metal having enhanced load bearing capacity. Such metals may have a Rockwell hardness rating of 41 or below. In addition, gripper body metals can now be selected in addition to E9310, and a greater range of metal curing or heat treatments now are available, including through hardening, if desired, as compared with case hardened steel. By selecting individual metals that best match the different function of the gripper body and the gripper insert, one can fabricate a gripper jaw of enhanced integrity, longevity and stability. Moreover, by providing means for replacing the cable gripping mechanism or cable gripping means of a gripper wedge member or gripper jaw component or member, the longevity of the gripper is enhanced and conserved because only the insert needs to be replaced in the event the gripping means or teeth become worn.

Method of Use Example

A gripper system 10 can be assembled and installed into a cable pulling device or apparatus. In one example illustrated in FIG. 2, gear segments are attached to wedge pieces 20 and then installed in the apparatus, for example, by passing shafts 90 and 100 through apparatus casing or manifold openings 35 into their pivot point apertures on their respective opposing wedge pieces 20. The shafts can be secured to wedge pieces 20 by means of a set screw 93. The wedge pieces can be rotated until the gear teeth are nominally engaged and an elastomer or O-ring can be extended over tension bolts 80 (or this step may happen before the wedge pieces are placed in the casing opening), such that lateral rotation of wedge pieces 20 is limited. The wedge pieces are rotated into an open position and, if desired, locked in the open position by, for example, rotating locking mechanism knob 140 and engaging spring-loaded locking pin 110. A cable or wire rope then is inserted in the opening between the wedge pieces; the locking mechanism disengaged, and pivot shaft 90 rotated to close the wedge pieces and bring the inner concave surfaces of each wedge onto the wire rope surface.

Embodiments of this disclosure may be embodied in other specific forms without departing from the spirit or essential characteristics thereof. The present embodiments are therefore to be considered in all respects as illustrative and not restrictive, the scope of the disclosure being indicated by the appended claims rather than by the foregoing description, and all changes that come within the meaning and range of equivalency of the claims are therefore intended to be embraced therein. While illustrative embodiments have been illustrated and described, it will be appreciated that various changes can be made therein without departing from the spirit and scope of the disclosure.

The embodiments of the invention in which an exclusive property or privilege is claimed are defined as follows:

1. An compact, integrated, mechanical means for gripping and releasing a cable, the means comprising:
   two opposing gripper members, each member having a concave inner cable gripping surface, said cable gripping surfaces together defining an axial channel for receiving a cable;
   mechanical means for timing the closure of said gripper members about a cable surface such that each said cable member applies substantially the same pressure on said cable at substantially the same time, and
   mechanical means for pivoting said timing means to close said gripper members about said cable.

2. The integrated gripper means of claim 1 further comprising means for limiting the rotation of said gripper members.

3. The integrated gripper means of claim 2 wherein said rotation limiting means comprises means for maintaining tension on a maximal open position of said gripper members.

4. The gripper means of claim 3 wherein said rotation limiting means comprises an elastomeric band.

5. The gripper means of claim 4 wherein said elastomeric band is an o-ring.

6. The gripper of claim 1 wherein said mechanical means for timing the closure of said gripper members comprises a gearing mechanism.

7. The gripper of claim 6 wherein said gearing mechanism comprises a gear segment attached to each said gripper member, such that said gear segments interact with a 1:1 ratio.

8. The gripper of claim 1 wherein said pivoting means comprises a shaft in operational association with each said gripper member, such that pivoting said shaft pivots said gripper member and engages said gearing segments.

9. The gripper of claim 1 further comprising means for locking said gripper members in an open position.

* * * * *